United States Patent [19]

Aoyama

[11] Patent Number: 4,922,383
[45] Date of Patent: May 1, 1990

[54] PHOTOGRAPHIC ILLUMINATION APPARATUS

[75] Inventor: Ryuichiro Aoyama, Tokyo, Japan

[73] Assignee: Kabushiki Kaisha Tocad (Tocad Corporation), Tokyo, Japan

[21] Appl. No.: 259,797

[22] Filed: Oct. 19, 1988

[30] Foreign Application Priority Data

Oct. 30, 1987 [JP] Japan .............. 62-165293[U]

[51] Int. Cl.⁵ .............................. G03B 15/02
[52] U.S. Cl. ........................... 362/10; 362/9
[58] Field of Search ............... 362/3, 9, 10, 191, 427, 362/430

[56] References Cited

U.S. PATENT DOCUMENTS

| | | | |
|---|---|---|---|
| 3,511,981 | 5/1970 | Haraden et al. | 362/3 |
| 3,603,781 | 9/1971 | Kobayashi et al. | 362/10 |
| 3,728,536 | 4/1973 | Baker | 362/10 |

*Primary Examiner*—Stephen F. Husar
*Attorney, Agent, or Firm*—Neuman, Williams, Anderson & Olson

[57] ABSTRACT

A protection structure is pivotal between a horizontal stored position in proximity to the underside of a case and an unstored position protruding downwardly and rearwardly from the case. In the stored position, the structure is in protective relation to an actuator of a power switch which controls energization of light-emitting unit from a power units, both mounted in the case. In the unstored position the structure is operable to mount the case on a camera through connecting and locking means thereon.

11 Claims, 2 Drawing Sheets

PHOTOGRAPHIC ILLUMINATION APPARATUS

BACKGROUND OF THE INVENTION

1. Field of the Invention

This invention relates to an illumination apparatus for use with motion picture or television cameras and more particularly to an illumination apparatus which is portable and very conveniently used, being easily and quickly secured to a camera to be ready for operation, while being trouble-free and reliable.

2. Background of the Prior Art

A popular type of illumination apparatus for motion picture or television apparatus includes a light-emitting unit which is separate from and connected through a cable to a power unit, the light-emitting unit being secured to the camera and the power unit being carried on the shoulder of the user.

SUMMARY OF THE INVENTION

This invention was evolved with the general object of providing an illumination apparatus which is more convenient to carry and operate and which has otherwise superior capabilities, while being reliable and trouble-free in operation and readily and economically manufacturable.

An important aspect of the invention is in the provision of a light-emitting unit and a power unit in a common case to provide unitary apparatus which is attachable to a camera so as to avoid the need for carrying the power unit on the shoulder and so as to also avoid the connecting cable, the power unit being preferably a self-contained battery unit. Another important aspect of the invention relates to the discovery and recognition of sources of problems with such unitary apparatus. It particular, it is desirable that a switch be provided to control energization of the light-emitting unit from the power unit with a button or other switch actuator being on the outside of the case of the apparatus for engagement by the user. It is found, however, that this desirable feature presents problems in that the actuator may be inadvertently engaged when storing or carrying the apparatus or at other times when operation is not desired. For example, if the apparatus is in a conventional type of bag, the switch actuator may be engaged by other contents of the bag or by inside surfaces of the bag, especially when the bag is swung or tossed about. The problem can be serious since there is no ventilation within a bag and the apparatus may be surrounded by heat insulating materials within the bag so that quite high temperatures may be developed from the considerable amount of heat which is usually developed by the light-emitting unit. Such high temperatures can easily cause damage to or destruction of the illumination apparatus and other contents of the bag and could cause a serious and dangerous fire.

In accordance with the invention, an arrangement is provided which protects against inadvertent switch actuation while also providing a compactly foldable mounting means for supporting from a camera a unitary apparatus which includes a light-emitting unit and power unit in a common case.

In accordance with a specific feature, a protection means is provided which is connected to the case for movement between a stored position in proximity to the case and an unstored position protruding away from the case, an actuating member of a power switch being accessible for engagement by a user when the protection means is in the unstored position and being protected against engagement when the protection means is in the stored position. The arrangement is such that if the protection means is not in the stored position when the apparatus is placed in a bag or otherwise stored, the protection means will be moved to the stored position through engagement with any object or surface which might have engaged the switch actuator if the protection means were not provided.

In accordance with specific features of the invention, the protection means is pivotally mounted on the case, preferably with one end thereof being pivotally secured to the case for movement about a horizontal axis which is approximately midway between forward and rearward ends of the case. In addition, the protection means in the unstored position preferably extends angularly downwardly and rearwardly at an acute angle such as to provide assurance that it may be readily moved to the stored position when inserted into a bag or otherwise stored.

Another feature is in the provision of a connection means at the terminal end of the protection means for mounting of the apparatus on a camera, preferably including a foot for engagement in the mounting shoe of a camera and a locking mechanism for securing the apparatus to the camera.

In a preferred construction as illustrated, the protection means includes an intermediate portion formed by a pair of spaced parallel side walls and a connecting wall, arranged to receive the switch structure in the stored position of the protection means.

This invention contemplates other objects, features and advantages which will become more fully apparent from the following detailed description taken in conjunction with the accompanying drawings.

DESCRIPTION OF A PREFERRED EMBODIMENT

Figure 1:
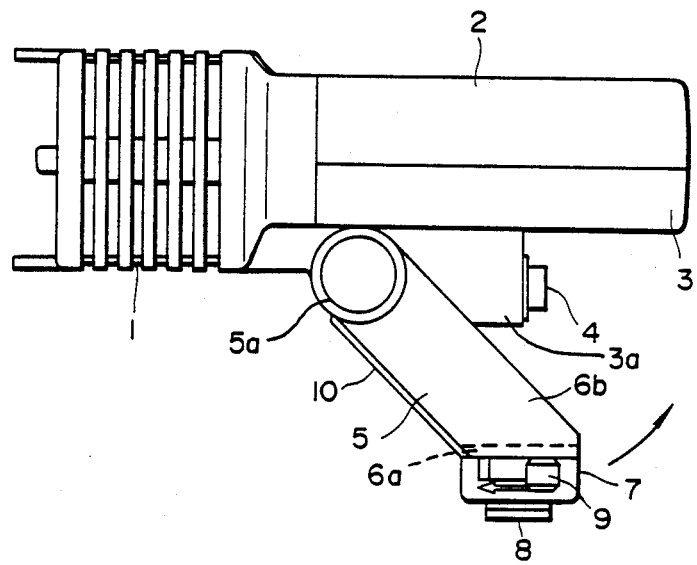
FIG. 1 is a side elevational view of illumination apparatus constructed in accordance with the invention, shown in a position and condition for use.

A light-emitting unit is generally designated by reference numeral 1 and is connected to the forward end of a power unit 2, the light-emitting unit 1 and power unit 2 being arranged in a common case which is designated by reference numeral 3. A power switch is included in a depending portion 3a of the case 3 and includes an actuating member in the form of a button 4 on the rear side of the depending portion 3a. Preferably, the switch is of a type such that the button 4 is slidable but it may by of a type with a depressible button.

Details of the light-emitting unit 1, the power unit 2, the power switch and the electrical connections within the case 3 are not provided since they may be suitably arranged as known in the art. The light-emitting unit 1 may include a lamp and a reflector and may otherwise be of a known type of construction. Similarly, the power unit 2 may comprise one or more batteries mounted within the rearward portion of the case 3 and standard types of electrical connections are provided to connect the power switch between the power unit 2 and the light-emitting unit 1.

In accordance with the invention, a protection means 5 is provided which also serves as a mounting means for mounting the apparatus on a camera, not shown. The protection means 5 is pivotally mounted on a forward end of the depending portion 3a of the case 3 through a suitable pivot arrangement which is indicated by reference numeral 5a and which is such as to provide sufficient frictional holding engagement as to operate through the protection means 5 to firmly support the units 1 and 2 and the case 3 from a camera while allowing the protection means to be manually moved to the folded storage position of FIG. 2.

The protection means 5 preferably includes an intermediate portion having a generally U-shaped configuration and including a portion 6a which connects the ends of as pair of spaced parallel side walls 6b, the opposite ends of the side walls being connected to portions which are used in providing the pivotal connection indicated by reference numeral 5a.

A locking mechanism 7 is secured to the portion 6a and which includes a foot 8 arranged for insertion in a conventional mounting shoe of a camera. Locking mechanism 7 further includes a lever 9 arranged to be moved in the direction of an arrow as shown in FIGS. 1 and 2, to securely lock the foot 8 to the shoe of the camera.

A plate 10 is secured to edges of the side walls 6b and extends from the locking mechanism 7 to the pivot connection 5a.

Figure 2:
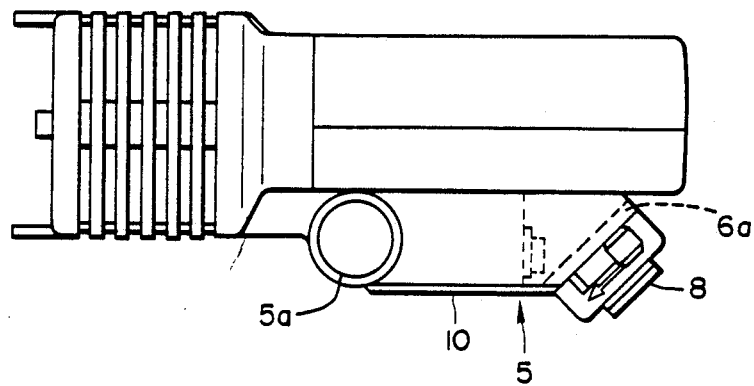
FIG. 2 is a side elevational view similar to FIG. 1, but showing the apparatus in a folded condition for storage.
Figure 3:
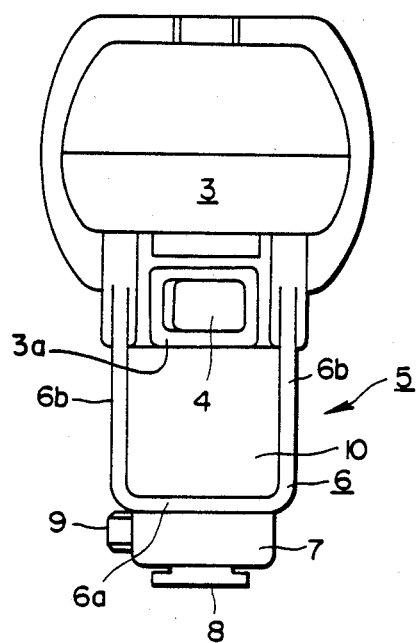
FIG. 3 is a rear elevational view of the apparatus when in the condition as depicted in FIG. 1.

When the apparatus is in the operative condition as shown in FIG. 1, the switch actuator 4 is accessible for operation to energize or deenergize the light-emitting unit 1 from the power unit 2. For storage of the apparatus, the protection means 5 may be rotated in a counterclockwise direction as viewed in FIGS. 1 and 2 to be moved from the position of FIG. 1 to the position of FIG. 2 in which it extends horizontally along the lower side of the case 3 in proximity thereto, the locking mechanism at the terminal end of the protection means 5 being in approximate register with the rearward end of the case 3. In the stored position of FIG. 2, the connecting portion 6a is behind the switch actuator 4 and a portion of the plate 10 is below the switch actuator 4 so as to insure that the switch actuator 4 will not be inadvertently engaged when the apparatus is stored.

The protection means 5 extends angularly away from the case 3 in the unstored position of FIG. 1, at an acute angle such that if the apparatus is inserted into a bag or is otherwise stored without first moving the protection means to the stored position, the protection means will be engaged and moved to the stored position by engagement with any object or surface which might have engaged the switch actuator 4 in the absence of the protection means 5, to thereby further provide protection against inadvertent actuation of the switch. The protection means 5, in also serving as a mounting means, has a highly desirable feature in that the light-emitting unit is placed at a position away from the camera. At the same time, the apparatus is quite compact when placed in the stored position of FIG. 2.

It will be understood that modifications and variations may be effected without departing from the spirit and scope of the novel concepts of this invention.

I claim:

1. An illumination apparatus for use with a motion picture or television camera or the like, comprising: a case including a built-in light-emitting unit, a power switch mounted on said case and including an actuating member for engagement by the user to control energization of said light-emitting unit, and protection means connected to said case for movement between a stored position in proximity to said case and an unstored position protruding away from said case, said actuating member of said power switch being accessible for engagement by the user when said protection means is in said unstored position and being protected against engagement when said protection means is in said stored position so as to prevent inadvertent energization of said light-emitting unit, wherein said case further includes a built-in power unit for supplying power to said light-emitting unit under control of said power switch.

2. An illumination apparatus for use with a motion picture or television camera or the like, comprising: a case including a built-in light-emitting unit, a power switch mounted on said case and including an actuating member for engagement by the user to control energization of said light-emitting unit, and protection means connected to said case for movement between a stored position in proximity to said case and an unstored position protruding away from said case, said actuating member of said power switch being accessible for engagement by the user when said protection means is in said unstored position and being protected against engagement when said protection means is in said stored position so as to prevent inadvertent energization of said light-emitting unit, wherein said protection means includes a portion formed by a pair of spaced generally parallel side wall portions and a connecting wall portion between edges of said side wall portions, said actuating member of said power switch being positioned between said side wall portions and being protected by said connecting wall portion when said protection means is in said stored position thereof.

3. An illumination apparatus for use with a motion picture or television camera or the like, comprising: a case including a built-in light-emitting unit, a power switch mounted on said case and including an actuating member for engagement by the user to control energization of said light-emitting unit, and protection means connected to said case for movement between a stored position in proximity to said case and an unstored position protruding away from said case, said actuating member of said power switch being accessible for engagement by the user when said protection means is in said unstored position and being protected against engagement when said protection means is in said stored position so as to prevent inadvertent energization of said light-emitting unit, wherein said protection means in said stored position is in proximity to a lower side of said case and wherein said protection means in said unstored position extends downwardly and rearwardly from said lower side of said case.

4. An illumination apparatus as defined in claim 3, wherein said protection means includes an end portion connected to said case for pivotal movement of said protection means about a horizontal axis when moved between said stored and unstored positions.

5. An illumination apparatus as defined in claim 3, wherein said protection means operates as a mounting means and includes a terminal end portion, a foot structure on said terminal end portion for engagement in a protection shoe of a camera, and locking means on said terminal end portion for securely engaging said protection shoe to support said illumination apparatus on said camera.

6. An illumination apparatus as defined in claim 5, wherein said protection means includes an intermediate portion which extends from said terminal end portion toward said case and which is formed by a pair of spaced generally parallel side walls and a connecting wall between said side wall portions, said actuating member of said power switch being positioned between said side wall portions and being protected by said connecting wall when said protection means is in said stored position thereof.

7. An illumination apparatus as defined in claim 6, wherein said terminal end portion includes said connecting wall portion, said intermediate portion further including a plate structure secured to edges of said side walls.

8. An illumination apparatus as defined in claim 6, wherein said case includes a downwardly depending portion and wherein said switch actuating member is in the form of a button projecting rearwardly a rearward end of said downwardly projection portion, said downwardly extending portion and said button being positioned between said side walls and in front of said terminal end portion of said protection means when said protection means is in said stored position.

9. An illumination apparatus as defined in claim 3, wherein said protection means includes one end portion connected to said case for pivotal movement of said protection means about a horizontal axis when moved between said stored and unstored positions, said horizontal axis being positioned about mid-way between forward and rearward ends of said apparatus.

10. An illumination apparatus as defined in claim 9, said protection means when in said stored position extending rearwardly from said end portion to an opposite terminal end which is positioned in approximate register with a rearward end of said case.

11. An illumination apparatus as defined in claim 10, wherein said protection means when in said unstored position thereof is inclined downwardly and rearwardly to said terminal end thereof.

* * * * *